US011176220B2

(12) United States Patent
Jaggers et al.

(10) Patent No.: US 11,176,220 B2
(45) Date of Patent: Nov. 16, 2021

(54) SYSTEM AND METHOD FOR WEBSITE HOSTING

(71) Applicant: ORACLE INTERNATIONAL CORPORATION, Redwood Shores, CA (US)

(72) Inventors: Chad Daniel Jaggers, Bethany, OK (US); Rebecca Nathenson, Menlo Park, CA (US); Reagan Rachelle Anthony, Oklahoma City, OK (US)

(73) Assignee: Oracle International Corporation, Redwood Shores, CA (US)

( * ) Notice: Subject to any disclaimer, the term of this patent is extended or adjusted under 35 U.S.C. 154(b) by 504 days.

(21) Appl. No.: 15/701,878

(22) Filed: Sep. 12, 2017

(65) Prior Publication Data
US 2018/0330005 A1 Nov. 15, 2018

Related U.S. Application Data

(60) Provisional application No. 62/505,623, filed on May 12, 2017.

(51) Int. Cl.
*G06F 17/00* (2019.01)
*G06F 16/957* (2019.01)
(Continued)

(52) U.S. Cl.
CPC ............ *G06F 16/9577* (2019.01); *G06F 9/06* (2013.01); *G06F 16/20* (2019.01); *G06F 16/94* (2019.01); *G06F 16/986* (2019.01)

(58) Field of Classification Search
CPC .... G06F 16/9577; G06F 16/986; G06F 16/20; G06F 16/94; G06F 9/06
See application file for complete search history.

(56) References Cited

U.S. PATENT DOCUMENTS

| 8,166,155 B1* | 4/2012 | Rachmeler | G06F 11/3466 709/224 |
| 8,832,389 B2* | 9/2014 | Desai | G06F 12/1491 711/153 |

(Continued)

OTHER PUBLICATIONS

Stack Overflow; Jquery or Javascript that Display Content Based on the date HELP; pp. 1-3, downloaded on Oct. 17, 2017 from: https://stackoverflow.com/questions/4319135/jquery-or-javascript-that-display-content-based-on-the-date-help.

(Continued)

*Primary Examiner* — Mohammed H Zuberi
(74) *Attorney, Agent, or Firm* — Kraguljac Law Group, LLC

(57) ABSTRACT

Systems, methods, and other embodiments associated with website hosting are described. In one embodiment, a method includes maintaining a plurality of unpublished website versions that are available to assign as a live version of a website. The example method may also include selecting an unpublished website version from the plurality of unpublished website versions based upon an attribute of a request for the live version of the website satisfying a rule specifying that the unpublished website version is to be used as the live version of the website. The example method may also include reassigning the live version of the website from a current website version to the unpublished website version for the request. The example method may also include transmitting the unpublished website version as the live version of the website to the remote device over the network.

20 Claims, 9 Drawing Sheets

(51) Int. Cl.
*G06F 9/06* (2006.01)
*G06F 16/20* (2019.01)
*G06F 16/93* (2019.01)
*G06F 16/958* (2019.01)

(56) References Cited

U.S. PATENT DOCUMENTS

| | | | | |
|---|---|---|---|---|
| 9,658,993 | B2* | 5/2017 | Knobloch | G06F 8/71 |
| 9,973,371 | B1* | 5/2018 | Upadhyay | H04L 29/08072 |
| 10,558,741 | B2* | 2/2020 | Knobloch | G06F 16/958 |
| 2004/0148318 | A1* | 7/2004 | Taylor | G06F 16/958 |
| 2004/0148565 | A1* | 7/2004 | Davis | G06F 16/958 |
| | | | | 715/205 |
| 2006/0069745 | A1* | 3/2006 | Boyles | H04L 67/36 |
| | | | | 709/218 |
| 2007/0185927 | A1* | 8/2007 | Chess | G06F 16/958 |
| 2008/0109808 | A1* | 5/2008 | Wing | G06F 16/93 |
| | | | | 718/102 |
| 2009/0006953 | A1* | 1/2009 | Perantatos | G06F 16/958 |
| | | | | 715/700 |
| 2011/0029854 | A1* | 2/2011 | Nashi | G06F 16/958 |
| | | | | 715/229 |
| 2014/0095358 | A1* | 4/2014 | Chandrasekharan | G06Q 30/0643 |
| | | | | 705/27.2 |
| 2014/0317289 | A1* | 10/2014 | Shahpurwala | H04L 67/327 |
| | | | | 709/225 |
| 2015/0227533 | A1* | 8/2015 | Goldstein | G06F 40/166 |
| | | | | 707/661 |
| 2016/0077672 | A1* | 3/2016 | Anderson | G06Q 10/10 |
| | | | | 715/234 |
| 2018/0205780 | A1* | 7/2018 | Bettesworth | G06F 40/117 |
| 2019/0116222 | A1* | 4/2019 | Deeming | G06F 16/29 |

OTHER PUBLICATIONS

Jim Cheshire; Publishing a Web Site in Microsoft Expression Web; Apr. 13, 2007; pp. 1-6; downloaded on Oct. 17, 2017 from: http://www.informit.com/articles/article.aspx?p=691086&seqNum=3.

* cited by examiner

SYSTEM AND METHOD FOR WEBSITE HOSTING

This disclosure claims the benefit of U.S. Provisional Patent Application Ser. No. 62/505,623 filed May 12, 2017, titled "System and Methods for Generating Multiple Unpublished Versions of a Website for Content Control Management and Catalog Management", which is incorporated by reference herein in its entirety.

BACKGROUND

Many entities, such as businesses and users, provide services and/or information to others through websites. For example, a clothing company provides an e-commerce storefront through a shopping website. Visitors of the shopping website can view merchandise, create a shopping cart of selected pieces of merchandise, and purchase such merchandise from the shopping cart. The shopping website can be accessed from web browsers of remote devices using a web address. For example, a web server is configured to host and provide a live version of the shopping website to remote devices. That is, when a user inputs the web address into a web browser of a client device, a request is routed over a network to the web server based upon the web address. The web server is configured to provide a response to the client device based upon the request. The response comprises information, such as HTML, of the live version of the shopping website that can be used by the web browser to display the live version of the shopping website. The live version of the shopping website refers to the HTML, images, videos, text, user interface elements, and/or other content of the shopping website that is provided by the web server to a client device in a response to a request with the web address from the client device. In this way, the web browser of the client device displays the live version of the shopping website through a web browser based upon the information within the response.

The clothing company may want to update the shopping website. Accordingly, the clothing company can make changes to an unpublished version of the shopping website. That is, the unpublished version of the shopping website is the HTML, images, videos, text, user interface elements, and/or other content of the shopping website that is not actively provided by the web server to client devices in response to requests for the shopping website. Thus, the clothing company can make changes to the unpublished version of the shopping website without changing the live version of the shopping website being provided by the web server. Unfortunately, prior systems restrict how website versions are handled and are not flexible for making changes.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
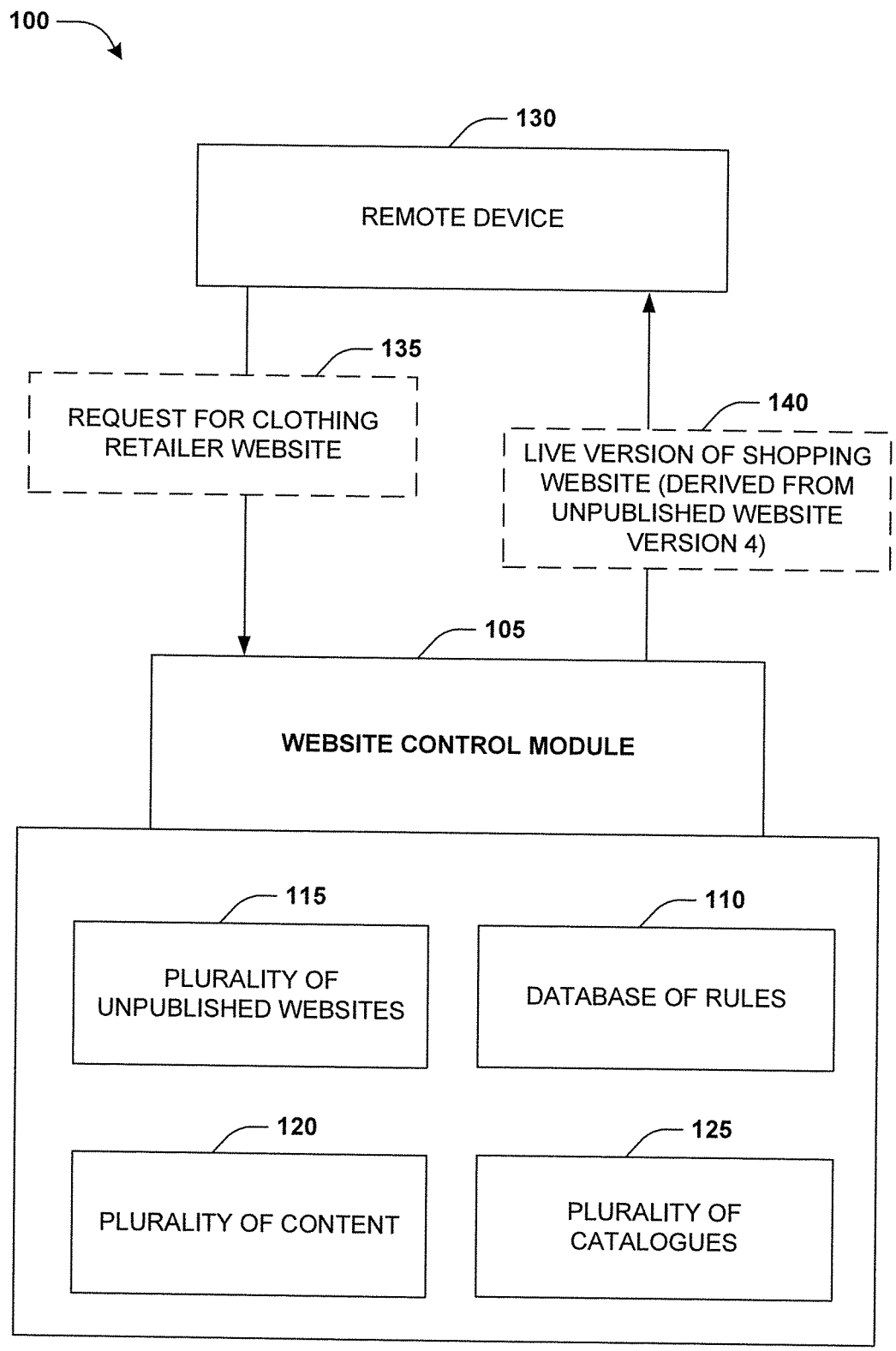
FIG. 1 illustrates an embodiment of a system associated with website hosting.

Computerized systems and methods are described herein that provide a website hosting and website control system. A web hosting platform, such as a distributed cloud computing environment of web servers, is configured to generate and provide a live version of a website to remote devices, such as to web browsers of client devices. The live version of the website comprises HTML, text, images, videos, web pages, user interface elements, and/or other content of the website that is provided from the web hosting platform to a remote device for display through a web browser. In this way, the live version is the content of the website that is actively provided by the web hosting platform in response to requests from remote devices for the website. The live version is the website content a user sees when the user visits a website.

As will be described herein, in one embodiment, multiple website versions can be generated and maintained allowing the present website control system to select a different website version of the website based on different conditions or rules. The selected website version is then assigned as the live version thereby replacing some or all of the previous live version. Thus, the present system provides an improved mechanism for maintaining and changing content of a website.

An administrator of the website may be tasked with maintaining and updating the website, such as to change a banner, text, and pricing information relating to various seasons and sales of merchandise available for purchase through the website. Accordingly, as disclosed herein, multiple unpublished versions of the website are maintained and selectively assigned/reassigned as the live version of the website based upon various rules. An unpublished version of the website refers to HTML, text, images, videos, web pages, user interface elements, and/or other content of the website that is not assigned as the live version of the website, and thus is not actively provided by the web hosting platform to remote devices requesting access to the website.

Thus, the administrator can make changes to an unpublished version of the website without modifying the live version that is currently provided to and displayed on remote devices.

To change the live version, a version of the website, such as an unpublished version, is selected and assigned as the live version. Thus the live version is replaced in whole or in part by the selected version. In one embodiment, the website control system determines which unpublished version to select based upon a condition or rule that is triggered/satisfied, such as a date rule, a business objective rule, an inventory rule, or a user demographic rule. In this way, different versions of the website can be assigned and reassigned as the live version of the website based upon various conditions, such as a current time being within a start date and an end date of an unpublished website version. By assigning start dates and end dates to unpublished website versions, a publication schedule is defined for the website control system for designating a sequence of unpublished website versions to use as the live version of the website, such as a July $4^{th}$ version around the Fourth of July, a Labor Day version around Labor Day, a Halloween version around Halloween, etc.

In one embodiment, a website may refer to a collection of one or more web pages that are connected together in various ways. A web page is a document that can be displayed within a web browser. It may be appreciated that the techniques provided herein are applicable to both websites and web pages, and thus techniques described with reference to websites can be equally applicable to web pages and vice versa.

With reference to FIG. 1, one embodiment of a computer system 100 associated with website hosting is illustrated. The computer system 100 includes a website control module 105, which can be configured to execute on a computer, such as computer 615 of FIG. 6. In one embodiment, the computer system 100 is hosted within a distributed cloud computing environment, such as a multi-tenant architecture that is used to develop and provide Internet/web-based services and business applications for end users. The multi-tenant architecture allows multiple accounts (tenants) and users to store and access data, and to utilize specific applications that reside on a remote platform having the multi-tenant architecture. The remote platform can be implemented as a set of servers or server groups that provide use of the multi-tenant architecture as a service to the accounts and users of each account. The services can provide data storage, computational processing power, data analytics, applications, and/or other Software-as-a-Service (SaaS), cloud-based services, web-services, or remote in the cloud services. Thus, the multi-tenant architecture can be used to develop, store, maintain, edit, and host a website that can be provided to remote devices of users. In this way, the website control module 105 of the computer system 100 is hosted on one or more computing devices, such as a web server, that is capable of providing a live version of the website to remote devices over a network.

The website control module 105 is configured to maintain a plurality of unpublished website versions 115 of a website, such as a clothing retailer website. Unpublished website versions are not actively provided to remote devices until assigned as the live version of the website. In one embodiment, the plurality of unpublished website versions 115 comprise a first unpublished website version of a fall clothing line for the clothing retailer website, such as a fall promotional banner, fall clothing images, etc. The plurality of unpublished website versions 115 comprise a second unpublished website version of a winter clothing line for the clothing retailer website, such as a winter promotional banner, winter clothing images, etc. The plurality of unpublished website versions 115 can be associated with a plurality of content 120, such as the fall promotional banner, the winter promotional banner, a spring promotional banner, images, videos, text, etc. In this way, content can be selectively used from the plurality of content 120 for populating the live version of the website, such as for transmission of HTML and/or other content of the live version of the website in response to requests from remote devices for the website.

The plurality of unpublished websites 115 can be populated based upon catalogues stored within a plurality of catalogues 125. In one embodiment, a catalogue comprises a collection of categories of items associated with the website, such as women's shirts, kid's shoes, scarfs, hats, backpacks, etc. In this way, a category of items can be associated with content of the website, such as a user interface that is to be populated with images and pricing information of scarfs.

The website control module 105 maintains a database of rules that specify when a particular unpublished website version is triggered/activated to be assigned as the live website. The rules may also include rules that specify which content of the plurality of content 120 is to be used to populate the live website under certain conditions, which catalogue of the plurality of catalogues 125 is to be used for populating the live website under certain conditions, etc. For example, a rule specifies that when a request 135 from a remote device 130 is received to view/access the website and an attribute or property of the request 135 matches or satisfies a condition defined in the rule, then an unpublished website version (identified by the rule) is to be used as the live version. The attribute can correspond to information within the request 135 or external information, such as a business objective or inventory metric that is in place when the request 135 is received. More examples are described herein.

In one embodiment, a date rule specifies that if a current date falls within a start date and an end date of an unpublished website version, then that unpublished website version is to be assigned as the live version of the website, such as by reassigning the live version from a current website version (e.g., a default website version) to the unpublished website version. The current date can correspond to a timestamp of the request 135, and thus the timestamp is an attribute that is evaluated against the database of rules 110.

In one embodiment, a business objective rule is used to evaluate an attribute of the request 135. The attribute can correspond to a current business metric in place at the time of receiving the request 135, such as a profit margin of an item, revenue, a sales level of an item, a sales velocity of an item, etc. The business objective rule could specify that if a profit margin on a particular item is above a threshold value, then a first unpublished website version highlighting that item is to be used as the live version of the clothing retailer website, otherwise, a second unpublished website version is to be used as the live version of the clothing retailer website.

In one embodiment, an inventory objective rule is used to evaluate an attribute of the request 135. The attribute can correspond to a current inventory metric at the time of receiving the request 135, such as an inventory level of an item, an expected shipment of the item, receipt of a threshold amount of the item, a shipment of the item that is in transit and/or within a threshold distance or time of being delivered, etc. The inventory objective rule could specify that if a threshold amount of the item is in transit to a warehouse on a particular item, then a third unpublished website version highlighting that item is to be used as the live version of the clothing retailer website, otherwise, the second unpublished website version is to be used as the live version of the clothing retailer website.

In one embodiment, a user demographic rule is used to evaluate an attribute of the request 135. The attribute can correspond to a user demographic of a user of the remote device 130, such as a gender, age, current location, occupation, purchase history, browser history, content of a calendar entry, content of an email message, content of a task item, frequently visited locations, previously visited locations, etc. The user demographic rule could specify that the first unpublished website version is to be used as the live version for a user with a calendar entry indicating that the user is going to the beach, otherwise, the second unpublished website version is to be used as the live version of the clothing retailer website.

In one embodiment, a content rule is used to evaluate an attribute of the request 135. The content rule could specify that a fall clothing image is to be used for populating the live version of the clothing retailer website if the request 135 is received between August $1^{st}$ and December $1^{st}$.

In one embodiment, a catalogue rule is used to evaluate an attribute of the request 135. The catalogue rule could specify that a first catalogue of the plurality of catalogues is to be used for the live version of the clothing retailer website if the request 135 is received between August $1^{st}$ and December $1^{st}$. The first catalogue may comprise a collection of categories of items relating to fall clothing.

In one embodiment, a conflict is detected for populating a content area of the live version of the clothing retailer website. For example, the database of rules 110 may comprise multiple rules that are satisfied by conditions of the request 135, and such rules assign different content to the content area such as a soccer ball image assigned by a first rule and a shoe image assigned by a second rule. The conflict is resolved by iteratively evaluating potential content for populating the content area starting from current content currently assigned to the content area and working backwards through prior content. A date conflict resolution condition or other conflict resolution conditions that prioritize certain rules over other rules can be used to identify target content for populating the content area. In one embodiment, the date conflict resolution condition specifies that a most recent rule or a rule that assigns the most temporally relevant content in relation to a current date is be used over other rules.

In this way, a publication schedule for the clothing retailer website is specified using the database of rules 110. The publication schedule designates a sequence of unpublished website versions to use as the live version of the website over time based upon start dates and end dates assigned to each unpublished website version. In one embodiment, the website control module 105 is configured to monitor and identify the start dates, end dates, and date rules assigned to different unpublished website versions and compare the assigned dates to a current date/time. The website control module 105 uses the assigned dates to control and select which unpublished version is assigned as the live version based on the comparison to the current date or date range that can trigger a different website version to be the live version. For example, by setting start and end dates/times based on yearly seasons, a different website version can be activated and assigned as the live version for each season, such as a fall website version, a winter website version, a spring website version, and a summer website version.

In one embodiment, the request 135 is received by the website control module 105 from the remote device 130 at 3:00 pm on July $2^{nd}$. The website control module 105 evaluates the attribute of the date of 3:00 pm on July $2^{nd}$ against the database of rules 110 to determine that a date rule specifies that a fourth unpublished website version is to be used because the attribute falls within a start date of June $20^{th}$ and an end date of July $4^{th}$ of the fourth unpublished website version. The website control module 105 reassigns the live version of the website from a current website version such as a default website version of the clothing retailer website to the fourth unpublished website version for this particular request 135. In this way, the website control module 105 provides HTML, images, videos, text, user interface elements, and/or other content of the fourth unpublished website version in a response 140 to the remote device 130 for rendering through a display of the remote device 130. In one embodiment where the current date does not fall within any date ranges of unpublished website versions, the default website version is utilized as the live version of the website.

Figure 2:
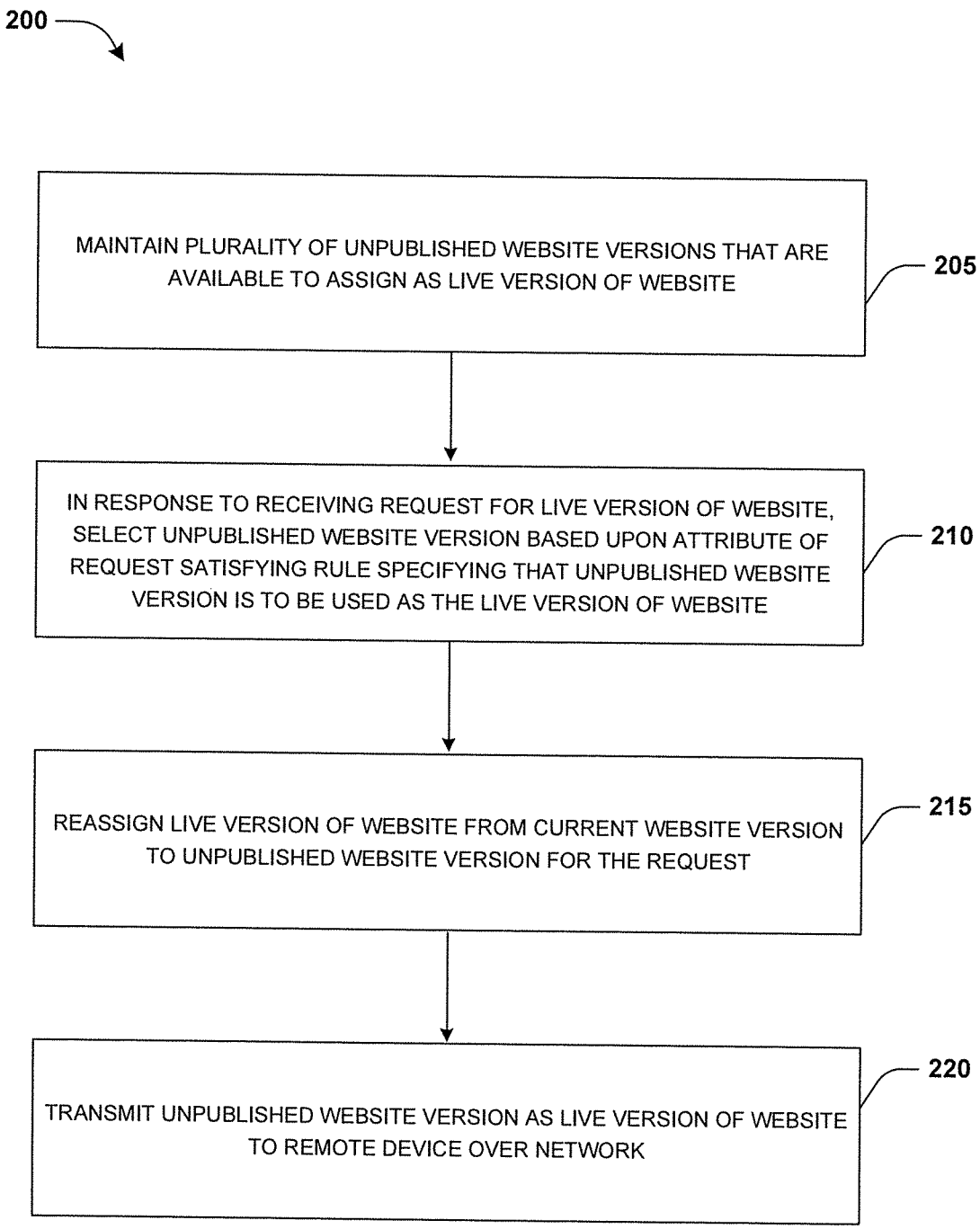
FIG. 2 illustrates an embodiment of a method associated with website hosting.

With reference to FIG. 2, one embodiment of a computer implemented method 200 associated with website hosting is illustrated. In one embodiment, the method 200 is performed by the website control module 105 utilizing various computing resources of the computer 615, such as the processor 620 for executing instructions associated with maintaining a plurality of unpublished website versions of a website, hosting a live version of the website, and facilitating the creation and modification of unpublished website versions of the website. Memory 635 and/or disks 655 are used for storing website versions of the website, content of the website, rules, catalogues, and/or other data. Network hardware is used for communicating data structures and/or other data between the computer 615 and remote computers over a network. The method 200 is triggered upon receiving a request from a remote device for the live version of the website.

Figure 3A:
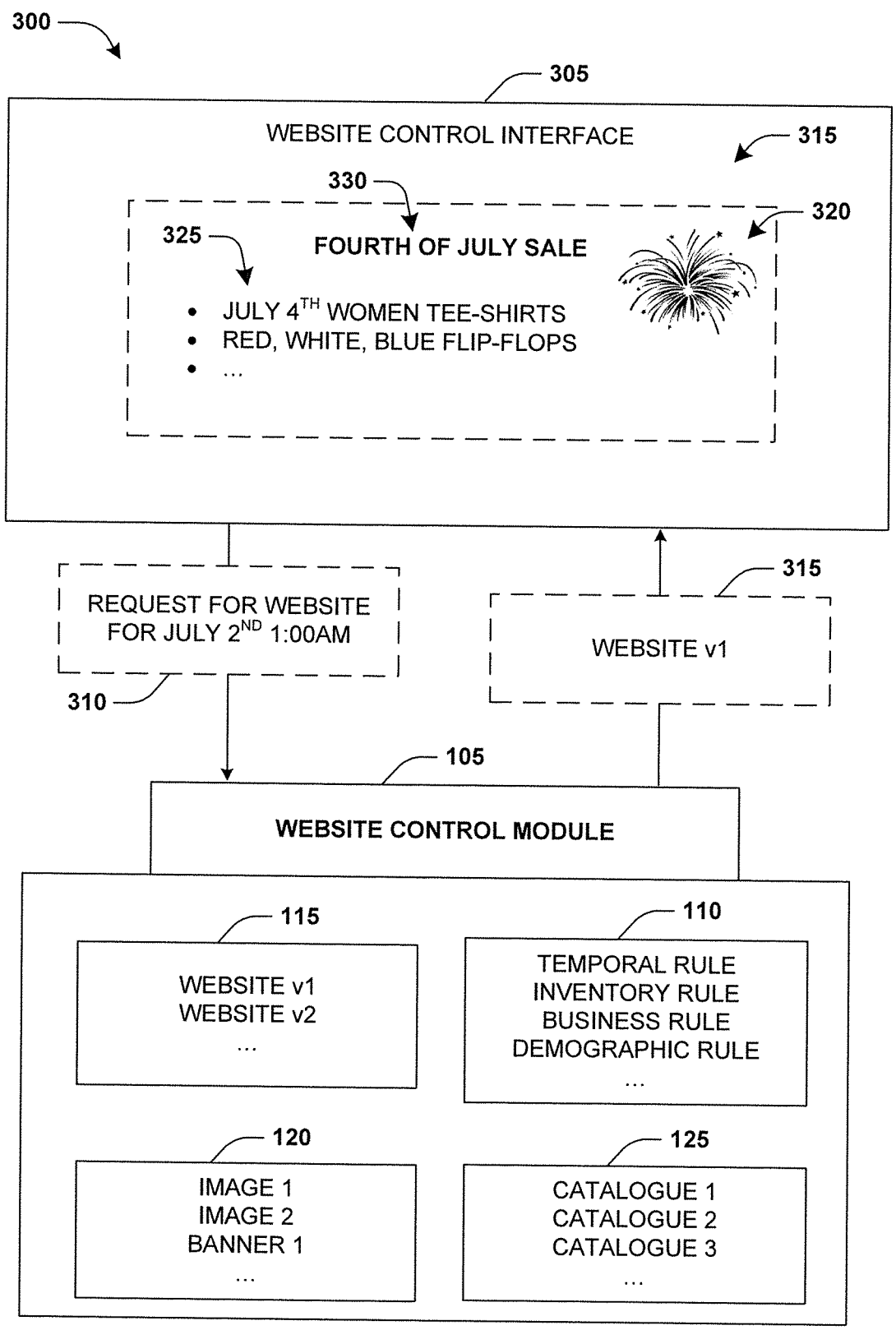
FIG. 3A illustrates an embodiment of a system associated with website hosting, where an unpublished website version is provided through a website manager interface for viewing and/or modification.

At 205, a plurality of unpublished website versions 115 are maintained, as illustrated by example system 300 of FIG. 3A. In one embodiment, the website control module 105 is configured to provide a website manager interface 305 through which an administrator of the website can view, modify, and/or create the plurality of unpublished website versions 115, such as versions of a clothing website. The website manager interface 305 can be rendered on a display of an administrator computing device. In one embodiment, a distributed cloud computing environment hosts or provides access to the website manager interface 305.

In one embodiment, a request is received through the website manager interface 305 to display an unpublished website version corresponding to a requested point in time. A database is queried using the requested point in time to identify a target unpublished website version that has a start date and an end date within which the requested point in time falls. In this way, the target unpublished website version is rendered through the website manager interface 305.

FIG. 3A illustrates the administrator submitting a request 310 through the website manager interface 305 for a version of the clothing website that would be assigned as a live version of the clothing website on a future date of July $2^{nd}$ at 1:00 am. The website control module 105 evaluates an attribute of the request, such as the date of July $2^{nd}$ at 1:00 am, against the database of rules 110 to determine which unpublished website version of the plurality of unpublished website versions 115 would be provided as the live version.

In one embodiment, the attribute satisfies a temporal rule specifying that a first unpublished website version 315 is to be used for requests received between June 20$^{th}$ and July 6$^{th}$. Accordingly, the first unpublished website version 315 is rendered through the website manager interface 305 for viewing and/or modification. The first unpublished website version 315 comprises content such as a fireworks image 320 and a fourth of July sale banner 330 selected from the plurality of content 120. The first unpublished website version 315 comprises content 325 corresponding to items categorized within a catalogue selected from the plurality of catalogues, such as items relating to a July 4$^{th}$ sale. The administrator may edit, delete, add, modify, and/or save such edits to the first unpublished website version 315.

Figure 3B:
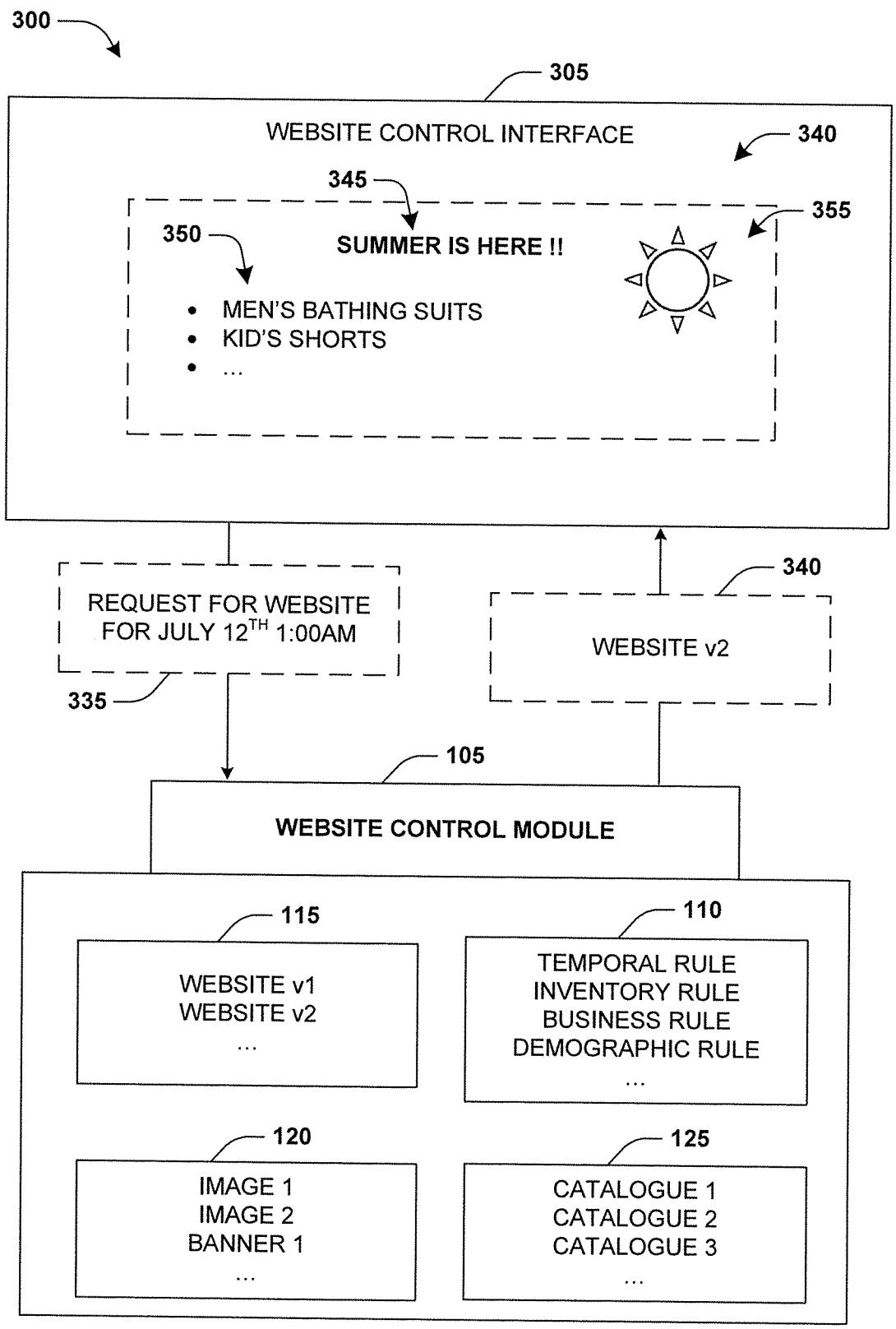
FIG. 3B illustrates an embodiment of a system associated with website hosting, where an unpublished website version is provided through a website manager interface for viewing and/or modification.

FIG. 3B illustrates the administrator submitting a second request 335 through the website manager interface 305 for a version of the clothing website that would be assigned as a live version of the clothing website on a future date of July 14$^{th}$ at 1:00 am. The website control module 105 evaluates an attribute of the request, such as the date of July 14$^{th}$ at 1:00 am, against the database of rules 110 to determine which unpublished website version of the plurality of unpublished website versions 115 to provide. In one embodiment, the attribute satisfies a temporal rule specifying that a second unpublished website version 340 is to be used for requests received between July 7$^{th}$ and August 1$^{st}$. Accordingly, the second unpublished website version 340 is rendered through the website manager interface 305 for viewing and/or modification. The second unpublished website version 340 comprises content such as a sun image 355 and a summer banner 345 selected from the plurality of content 120. The second unpublished website version 340 comprises content 350 corresponding to items categorized within a catalogue selected from the plurality of catalogues, such as items relating to a summer clothing. The administrator may edit, delete, add, modify, and/or save such edits to the second unpublished website version 340.

Figure 3C:
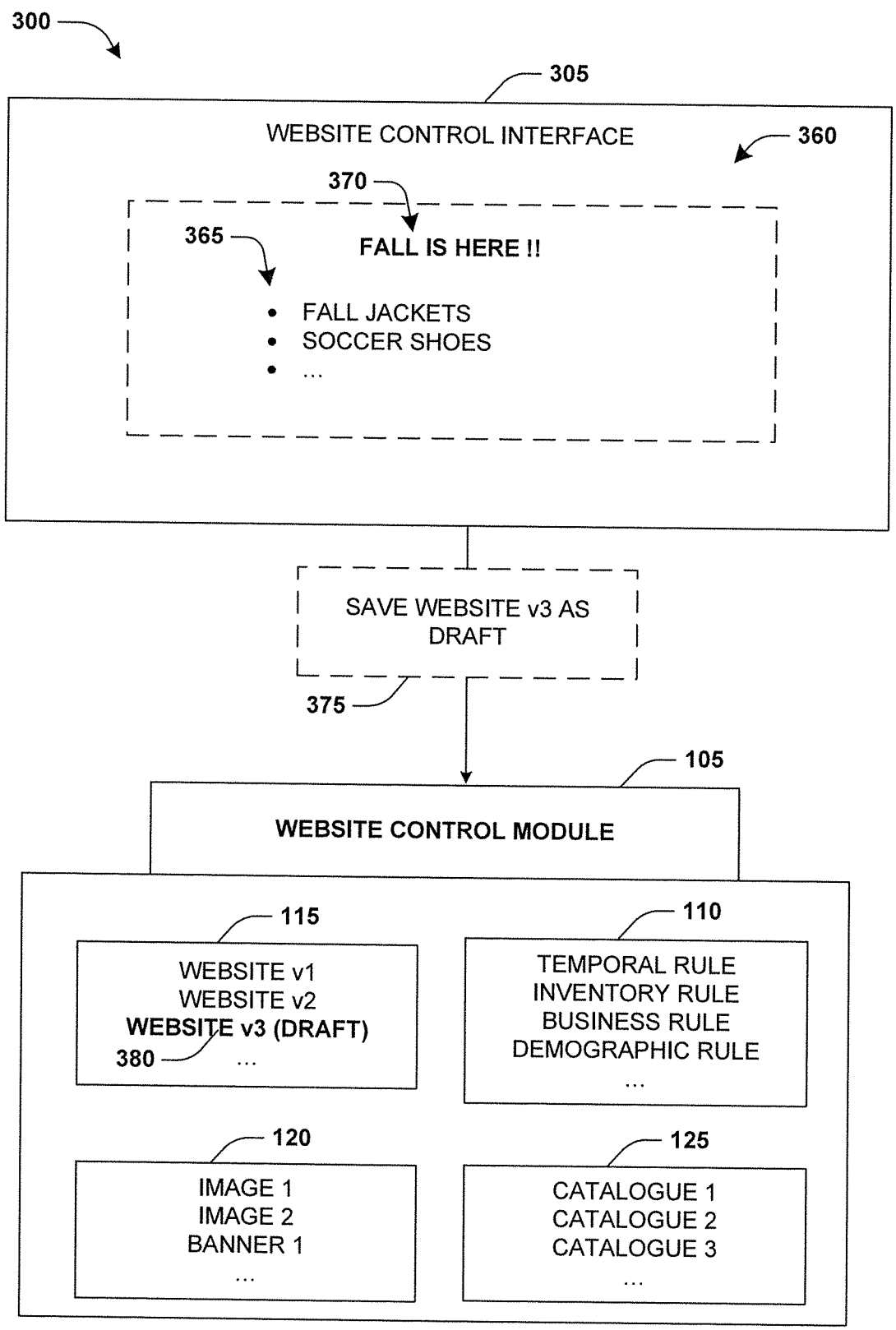
FIG. 3C illustrates an embodiment of a system associated with website hosting, where a new unpublished website version is created through a website manager interface and saved as a draft.

FIG. 3C illustrates the administrator creating a third unpublished website version 360 through the website manager interface 305 hosted by the website control module 105. The administrator can create the third unpublished website version 360 by adding content into the third unpublished website version 360, such as images, text, labels, text boxes, drop down boxes, links, and/or other user interface elements and objects. In one embodiment, the administrator can add a fall banner 370 and a list of items 365 corresponding to clothing sold by the clothing retailer. The administrator can assign a start date to the third unpublished website version 360 for when the third unpublished website version 360 is to be used as the live version of the clothing website. The administrator can optionally add an end date to the third unpublished website version 360 for when the third unpublished website version 360 is no longer to be used as the live version of the clothing website. In one embodiment, the administrator can save the third unpublished website version 360 so that the website control module 105 will use the third unpublished website version 360 as the live version for the clothing website for requests received between the start date and the end date. In another embodiment, the administrator can save the third unpublished website version 360 as a draft 380. In response to receiving a save as draft command 375 for the third unpublished website version 360, the website control module 105 sets a flag to override the start date so that the third unpublished website version 360 does not go live until the third unpublished website version 360 is saved without being flagged as the draft 380.

In one embodiment, the website manager interface 305 allows the administrator to use a clipboard command for content within the third unpublished website version 360. In response to receiving a clipboard command for content such as for a social network user interface element, the website control module 105 creates a clipboard object for the content. The clipboard object can be dragged and dropped into the third unpublished website version 360 or other unpublished website versions rendered through the website manager interface 305 so that instances of the content can be added into unpublished website versions, such as during a subsequent session of the administrator accessing the website manager interface 305 (e.g., the clipboard object may be saved and used later for the same clothing website or other websites). In another embodiment, the website manager interface 305 allows the administrator to define new content types that can be applied to content within unpublished website versions. For example, the administrator can define a content type of an icon with a particular pixel height and width that displays information from a social network page of the clothing retailer.

The administrator can view, edit, and/or create new catalogues through the website manager interface 305. In one embodiment, the administrator requests access to the second catalogue within the plurality of catalogues 125. Accordingly, the website control module 105 renders the second catalogue, such as a collection of categories of items associated with the clothing website such as men's shoes, outdoor apparel, backpacks, etc. In response to receiving a copy command through the website manager interface 305, the second catalogue is copied to create a copied catalogue for editing. The administrator can add, delete, or modify categories of items within the copied catalogue, thus modifying the copied catalogue to create a new catalogue that can be saved into the plurality of catalogues 125 for later use.

In this way, the website manager interface 305 can be used to access, modify, and/or create new unpublished website versions, catalogues, content, content types, etc. associated with the clothing website.

The website control module 105 is also configured to provide users with access to a live version of the clothing retailer website.

Figure 4A:
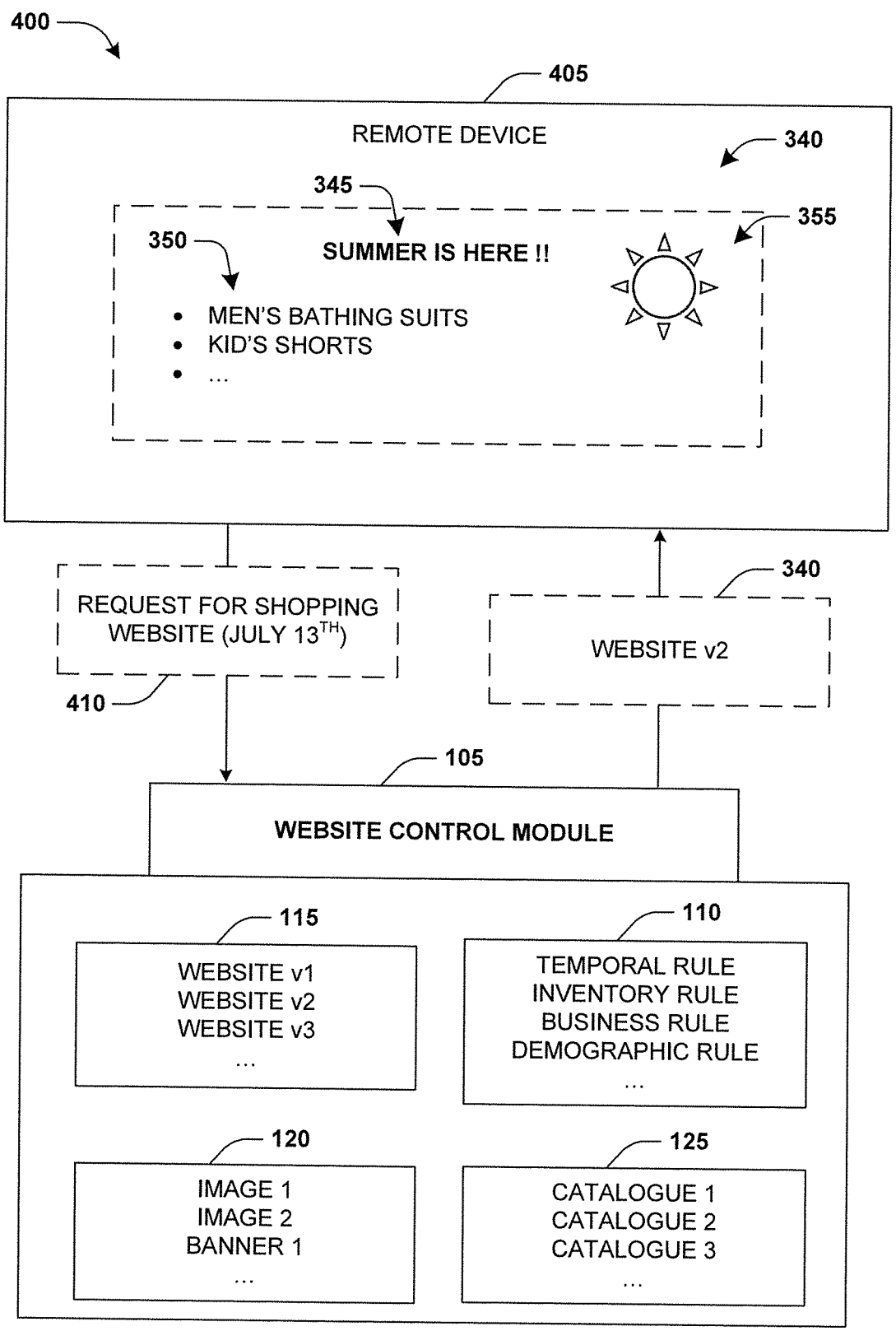
FIG. 4A illustrates an embodiment of a system associated with website hosting, where an unpublished website version is assigned and provided as a live version of a website.

Accordingly, at 210, the website control module 105 is configured to receive a request 410 for the live version of the clothing website, as illustrated by example system 400 of FIG. 4A. In one embodiment, a user of a remote device 405 inputs a web address for the clothing website through a web browser. The web browser creates and sends the request 410, comprising the web address, over a network to a web server hosting the website control module 105. The request 410 is associated with a condition, such as a request date of July 13$^{th}$, a user demographic, a business objective, an inventory metric, etc.

The website control module 105 determines that the request 410 is for the live version of the clothing website based upon the web address, such as for a landing page of the clothing website. The website control module 105 evaluates the attribute against the database of rules 110 to determine which unpublished website version of the plurality of unpublished website versions 115 to select for assignment/reassignment as the live version of the clothing website. In one embodiment, the attribute satisfies a temporal rule that the second unpublished website version 340 is to be used as the live version based upon the attribute of July 13$^{th}$ falling within a start date and an end date of the second unpublished website version 340.

In another embodiment, the attribute satisfies an inventory rule that the second unpublished website version 340, highlighting men's bathing suits, is to be used as the live version based upon an inventory metric in place during the attribute of July 13$^{th}$ indicating that a large number of men's bathing suits are in route to a warehouse. In another embodiment, the attribute satisfies a business rule that the second unpublished website version 340, highlighting kid's shorts, is to be used as the live version based upon a business objective in place during the attribute of July 13$^{th}$ indicating that a profit margin for kid's shorts is greater than a threshold amount. In another embodiment, the attribute (e.g., the request 410 comprises user profile information of a user accessing the clothing website) satisfies a demographic rule that the second unpublished website version 340, highlighting kid's shorts, is to be used as the live version for users accessing the clothing website that are parents of middle school children.

Accordingly, the website control module 105 assigns the second unpublished website version 340 as the live version of the clothing retailer website, at 215. In one embodiment, the live version is reassigned from a current version of the clothing website such as a default version to the second unpublished website version 340. HTML, images, videos, text, user interface elements and/or other content of the second unpublished website version 340 is transmitted over a network to the remote device 405 for rendering through a web browser of the remote device 405, at 220. The second unpublished website version 340 comprises a summer banner 345, a sun image 355, a list of items 350 sold by the clothing retailer, etc.

Figure 4B:
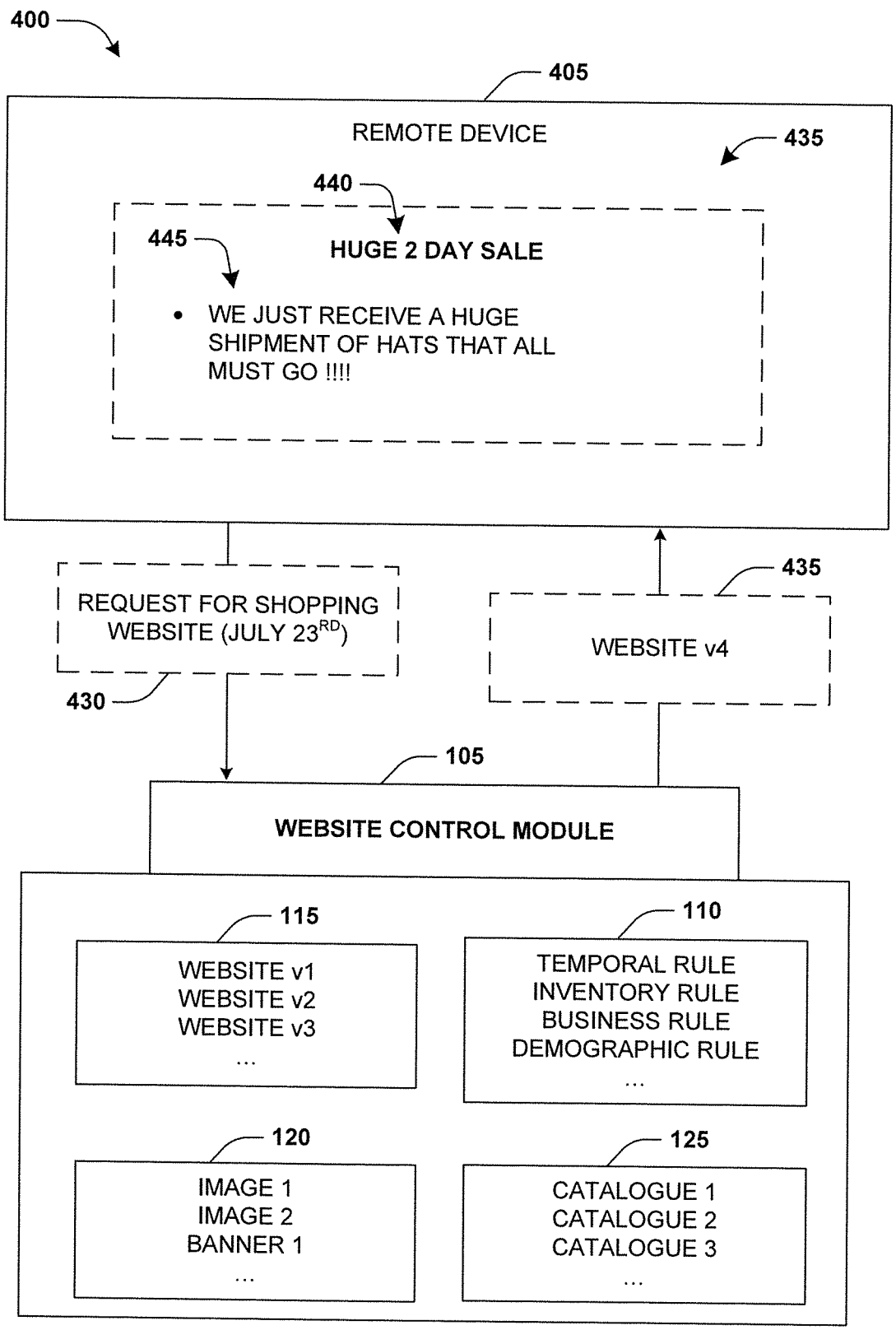
FIG. 4B illustrates an embodiment of a system associated with website hosting, where an unpublished website version is assigned and provided as a live version of a website.

FIG. 4B illustrates the website control module 105 receiving a request 430 on July 23$^{rd}$ for a live version of the clothing website. The website control module 105 evaluates an attribute of the request 430, such as the date of July 23$^{rd}$, against the database of rules 110 to determine which unpublished version of the clothing website to provide as the live version. In one embodiment, the attribute of July 23$^{rd}$ is associated with an inventory metric that a large shipment of hats has been received on or around July 23$^{rd}$. Accordingly, an inventory rule may specify that if a shipment of hats greater than a threshold amount has been received within a threshold timespan of a current date of a request, then a fourth unpublished website version 435 of the clothing website is to be provided as the live version because the fourth unpublished website version 435 comprises content 445 relating to hats and a banner 440 relating to a sale on hats.

Accordingly, the website control module 105 assigns the fourth unpublished website version 435 as the live version of the clothing website. In one embodiment, the live version is reassigned from a current version of the clothing website such as a default version to the fourth unpublished website version 435. HTML, images, videos, text, user interface elements and/or other content of the fourth unpublished website version 435 is transmitted over a network to the remote device 405 for rendering through a web browser of the remote device 405.

Figure 5:
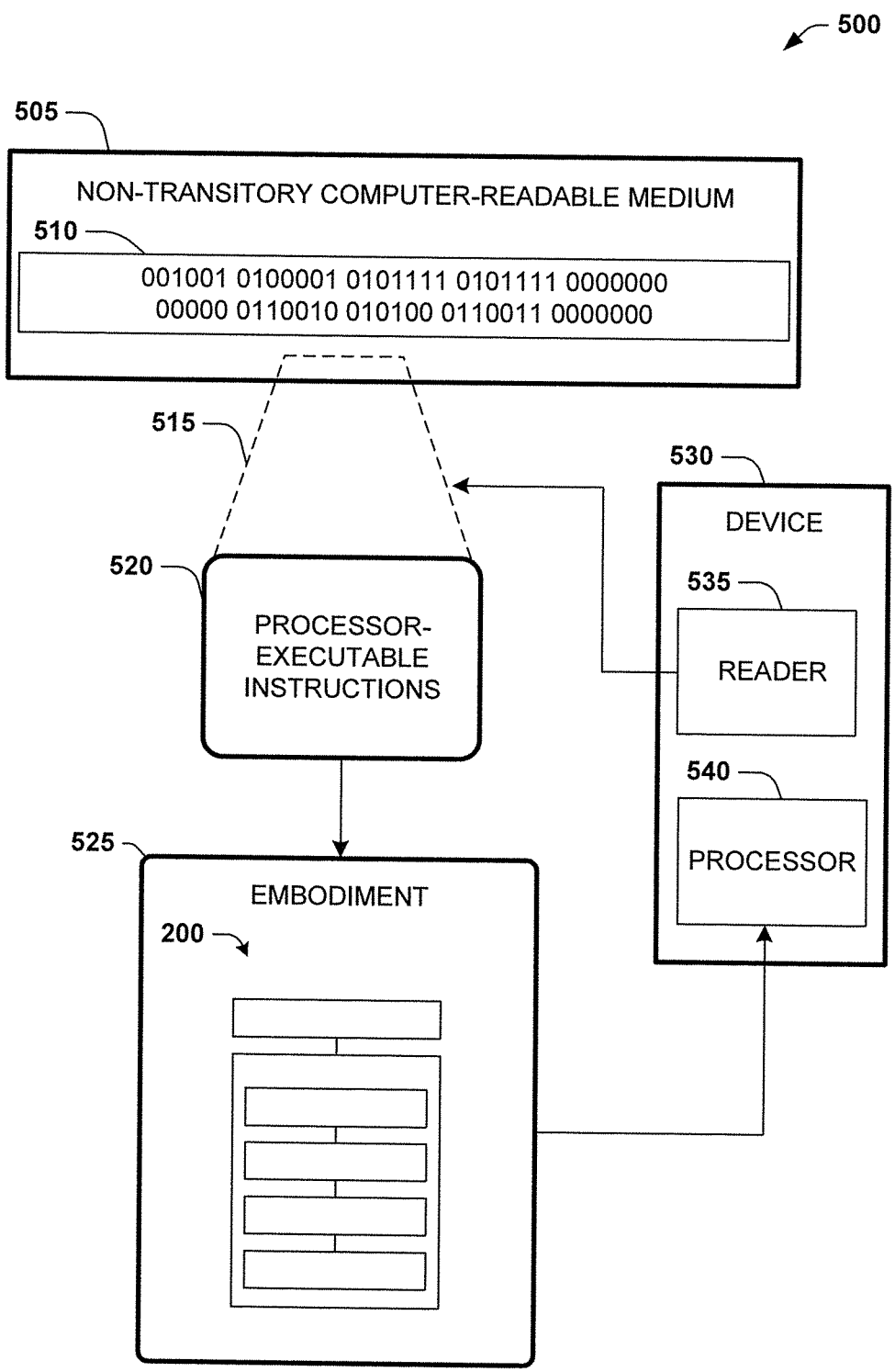
FIG. 5 illustrates an embodiment of a non-transitory computer-readable medium.

FIG. 5 is an illustration of a scenario 500 involving an example non-transitory computer-readable medium 505. In one embodiment, one or more of the components described herein are configured as program modules, such as the website control module 105, stored in the non-transitory computer-readable medium 505. The program modules are configured with stored instructions, such as processor-executable instructions 520, that when executed by at least a processor, such as processor 540, cause the computing device to perform the corresponding function(s) as described herein. In one embodiment, the, functionality of the website control module 105, stored in the non-transitory computer-readable medium 505, may be executed by the processor 540 as the processor-executable instructions 520 to perform an embodiment 525 of the method 200 of FIG. 2.

The non-transitory computer-readable medium 505 includes the processor-executable instructions 520 that when executed by a processor 540 cause performance of at least some of the provisions herein. The non-transitory computer-readable medium 505 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 505 stores computer-readable data 510 that, when subjected to reading 515 by a reader 535 of a device 530 (e.g., a read head of a hard disk drive, or a read operation invoked on a solid-state storage device), express the processor-executable instructions 520.

In some embodiments, the processor-executable instructions 520, when executed cause performance of operations, such as at least some of the example method 200 of FIG. 2, for example. In some embodiments, the processor-executable instructions 520 are configured to cause implementation of a system, such as at least some of the example system 100 of FIG. 1, for example.

Figure 6:
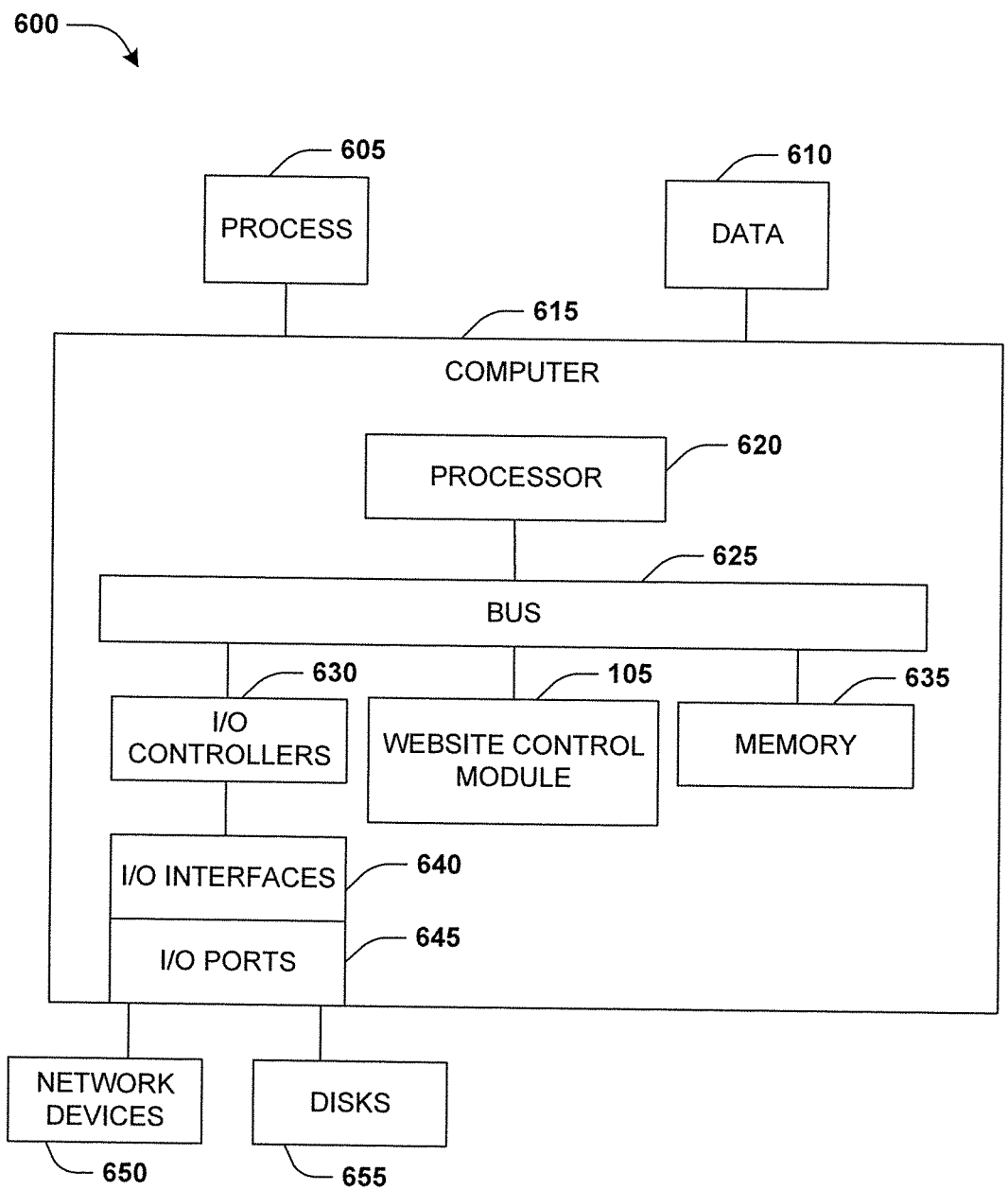
FIG. 6 illustrates an embodiment of a computing system configured with the example systems and/or methods disclosed.

FIG. 6 illustrates an example computing device 600 that is configured and/or programmed with one or more of the example systems and methods described herein, and/or equivalents. The example computing device 600 may be the computer 615 that includes a processor 620, a memory 635, and I/O ports 645 operably connected by a bus 625. In one embodiment, the, the computer 615 may include logic of the website control module 105 configured to facilitate the system 100 and/or the method 200 shown in FIGS. 1-2. In different embodiments, the logic of the website control module 105 may be implemented in hardware, a non-transitory computer-readable medium 605 with stored instructions, firmware, and/or combinations thereof. While the logic of the website control module 105 is illustrated as a hardware component attached to the bus 625, it is to be appreciated that in other embodiments, the logic of the website control module 105 could be implemented in the processor 620, stored in memory 635, or stored in disk 655.

In one embodiment, logic of the website control module 105 or the computer 615 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 615 as data 610 that are temporarily stored in memory 635 and then executed by processor 620.

The logic of the website control module 105 may also provide means (e.g., hardware, non-transitory computer-readable medium 605 that stores executable instructions, firmware) for performing rule based source sequencing for allocation.

Generally describing an example configuration of the computer 615, the processor 620 may be a variety of various processors including dual microprocessor and other multi-processor architectures. The memory 635 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 655 may be operably connected to the computer 615 via, for example, the I/O interface 640 (e.g., card, device) and the I/O ports 645. The disks 655 may be, for example, a magnetic disk drive, a solid state disk drive, a floppy disk drive, a tape drive, a Zip drive, a flash memory card, a memory stick, and so on. Furthermore, the disks 655 may be a CD-ROM drive, a CD-R drive, a CD-RW drive, a DVD ROM, and so on. The memory 635 can store a process, such as within the non-transitory computer-readable medium 605, and/or data 610, for example. The disks 655 and/or the memory 635 can store an operating system that controls and allocates resources of the computer 615.

The computer 615 may interact with input/output (I/O) devices via the I/O interfaces 640 and the I/O ports 645. The I/O devices may be, for example, a keyboard, a microphone, a pointing and selection device, cameras, video cards, displays, the disks 655, the network devices 650, and so on. The I/O ports 645 may include, for example, serial ports, parallel ports, and USB ports. I/O controllers 630 may connect the I/O interfaces 640 to the bus 625.

The computer 615 can operate in a network environment and thus may be connected to the network devices 650 via the I/O interfaces 640, and/or the I/O ports 645. Through the network devices 650, the computer 615 may interact with a network. Through the network, the computer 615 may be logically connected to remote computers (e.g., the computer 615 may reside within a distributed computing environment to which clients may connect). Networks with which the computer 615 may interact include, but are not limited to, a local area network (LAN), a new area network (WAN), and other networks.

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

The invention claimed is:
1. A non-transitory computer-readable medium storing computer-executable instructions that when executed by a processor of a computer causes the processor to:
   maintain a live version of a website that is actively provided by a web hosting platform in response to requests from remote devices to access the website;
   maintain a plurality of unpublished website versions that are available to assign as a live version of a website;
   wherein an unpublished website version is a website that is pre-existing and is not assigned as the live version of the website, and is not actively provided by the web hosting platform to the remote devices requesting access to the website;
   in response to receiving a request over a network from a remote device requesting to access the live version of the website, identify at least one demographic attribute from a user profile associated with the request;
   evaluate the at least one demographic attribute of the request with one or more user demographic rules that assign different unpublished website versions to different demographic attributes including gender and age of a user associated with the request;
   select an unpublished website version from the plurality of unpublished website versions based upon:
      (i) the at least one demographic attribute of the request satisfying a user demographic rule specifying that the unpublished website version is to be used as the live version of the website in response to the request including the at least one demographic attribute; and
      (ii) a current date of the request falls within a start date and an end date assigned to the selected unpublished website version;
   reassign the live version of the website from a current website version to the unpublished website version selected for the request based in part on the at least one demographic attribute and the current date, wherein the unpublished website version becomes the live version and replaces the current website version; and
   transmit the selected unpublished website version as the live version of the website to the remote device over the network in response to the request to access the live version of the website.

2. The non-transitory computer-readable medium of claim 1, wherein the instructions comprise instructions to:
   determine the current date associated with the request.

3. The non-transitory computer-readable medium of claim 1, wherein the instructions comprise instructions to:
   determine the current date associated with the request;
   query a database using the current date to identify content having a start date and an end date within which the current date falls; and
   populate the selected unpublished website version as the live version of the website with the content.

4. The non-transitory computer-readable medium of claim 1, wherein the instructions comprise instructions to:
   render a website manager interface to an administrator;
   receive a request through the website manager interface to display an unpublished website version corresponding to a requested point in time;
   query a database using the requested point in time to identify a target unpublished website version that has a start date and an end date within which the requested point in time falls; and
   render the target unpublished website version through the website manager interface.

5. The non-transitory computer-readable medium of claim 1, wherein the instructions comprise instructions to:

maintain a content rule specifying that the live version of the website is to be populated with first content of a plurality of content based upon a content rule being satisfied by the at least one demographic attribute from the request.

6. The non-transitory computer-readable medium of claim 1, wherein the instructions comprise instructions to:

maintain a plurality of catalogues, wherein a catalogue comprises a collection of categories of items associated with the website; and maintain a catalogue rule specifying that the live version of the website is to be populated based upon a catalogue of the plurality of catalogues in response to a catalogue rule being satisfied by the at least one demographic attribute.

7. The non-transitory computer-readable medium of claim 1, wherein the instructions comprise instructions to:

maintain a plurality of catalogues, wherein a catalogue comprises a collection of categories of items associated with the website;

render a website manager interface to an administrator;

provide access through the website manager interface to a first catalogue;

in response to receiving a copy command through the website manager interface, copy the first catalogue to create a copied catalogue;

in response to receiving a modify command for the copied catalogue, modify the copied catalogue to create a second catalogue different than the first catalogue, wherein the modify command comprises at least one of a delete category command, a modify category command, or a create new category command.

8. The non-transitory computer-readable medium of claim 1, wherein the plurality of unpublished website versions are maintained within a distributed cloud computing environment configured to provide remote devices with access to the live version of the website.

9. A computing system, comprising:

a processor connected to memory; and a website control module stored on a non-transitory computer readable medium and configured with instructions that when executed by the processor cause the processor to:

maintain a live version of a website that is actively provided by a web hosting platform in response to requests from remote devices to access the website;

maintain a plurality of unpublished website versions that are available to assign as a live version of a website;

wherein an unpublished website version is a website that is not assigned as the live version of the website, and is not actively provided by the web hosting platform to the remote devices requesting access to the website;

in response to receiving a request over a network from a remote device for the live version of the website for rendering on a display of the remote device, identify at least one demographic attribute from a user profile associated with the request;

evaluate the at least one demographic attribute of the request with one or more user demographic rules that assign different unpublished website versions to different demographic attributes including gender and age of a user associated with the request;

select an unpublished website version from the plurality of unpublished website versions based upon:

(i) the at least one demographic attribute of the request satisfying a user demographic rule specifying that the unpublished website version is to be used as the live version of the website in response to the request including the at least one demographic attribute; and (ii) a current date of the request falls within a start date and an end date assigned to the selected unpublished website version, which includes querying a database using the current date to identify a target unpublished website version that has a start date and an end date within which the request falls;

reassign the live version of the website from a current website version to the selected unpublished website version for the request based on the at least one demographic attribute and the current date, wherein the unpublished website version becomes the live version and replaces the current website version; and transmit the selected unpublished website version as the live version of the website to the remote device over the network in response to the request to access the live version of the website.

10. The computing system of claim 9, wherein the instructions comprise instructions that cause the processor to:

render a website manager interface to an administrator;

create a new unpublished website version based upon input received through the website manager interface; and assign a start date for the new unpublished website version for when the new unpublished website version is to be used as the live version of the website.

11. The computing system of claim 10, wherein the instructions comprise instructions that cause the processor to:

assign an end date for the new unpublished website version for when the new unpublished website version is no longer to be used as the live version of the website.

12. The computing system of claim 10, wherein the instructions comprise instructions that cause the processor to:

in response to receiving a save as draft command for the new unpublished website version, set a flag to override the start date.

13. The computing system of claim 11, wherein the instructions comprise instructions that cause the processor to:

in response to a current date being greater than the end date, utilize a default website version as the live version of the website.

14. The computing system of claim 10, wherein the instructions comprise instructions that cause the processor to:

in response to receiving a clipboard command for first content of the new unpublished website version through the website manager interface, create a clipboard object for the first content, wherein the clipboard object is drag and drop enabled for adding instances of the first content into unpublished website versions of the website.

15. The computing system of claim 9, wherein the instructions comprise instructions that cause the processor to:

maintain a rule specifying that a target unpublished website version is to be used as the live version of the website based upon at least one of a business objective rule or an inventory rule being met by the request.

16. The computing system of claim 9, wherein the instructions comprise instructions that cause the processor to:

maintain a second user demographic rule specifying that a target unpublished website version is to be used as the live version of the website based upon the at least one user demographic attribute matching an occupation, a purchase history, or a browser history associated to the second user demographic rule.

17. A computer-implemented method, the computer-implemented method involving a computing device comprising a processor, and the computer-implemented method comprising:

maintain a live version of a website that is actively provided by a web hosting platform in response to requests from remote devices to access the website;

maintaining, by the processor, a plurality of unpublished web page versions that are available to assign as a live version of a web page of a website;

wherein an unpublished website version is a website that is not assigned as the live version of the website, and is not actively provided by the web hosting platform to the remote devices requesting access to the website;

in response to receiving a request over a network from a remote device for the live version of the web page for rendering on a display of the remote device, identifying at least one demographic attribute from a user profile associated with the request;

evaluating the at least one demographic attribute of the request with one or more user demographic rules that assign different unpublished web page versions to different demographic attributes including gender and age of a user associated with the request;

selecting, by the processor, an unpublished web page version from the plurality of unpublished web page versions based upon:
(i) the at least one demographic attribute of the request satisfying a user demographic rule specifying that the unpublished web page version is to be used as the live version of the web page in response to the request including the at least one demographic attribute; and (ii) a current date of the request falls within a start date and an end date assigned to the selected unpublished website version;

reassigning, by the processor, the live version of the web page from a current web page version to the selected unpublished web page version for the request based in part on the at least one demographic attribute and the current date, wherein the unpublished website version becomes the live version and replaces the current website version; and transmitting, by the processor, the selected unpublished web page version as the live version of the web page to the remote device over the network in response to the request to access the live version of the website.

18. The computer-implemented method of claim 17, further comprising:

determining that there is a conflict for populating a first content area of the selected unpublished web page version with content; and resolving the conflict by iteratively evaluating content from current content to prior content based upon a date conflict resolution condition to identify target content for populating the first content area.

19. The computer-implemented method of claim 17, further comprising:

rendering a website manager interface to an administrator;

creating a new unpublished web page version based upon input received through the website manager interface;

receiving a definition of a new content type through the website manager interface; and applying the new content type to content within the new unpublished web page version.

20. The computer-implemented method of claim 17, further comprising:

specifying a publication schedule for designating a sequence of unpublished web page versions to use as the live version of the web page, wherein the publication schedule assigns start dates and end dates to each unpublished web page version.

* * * * *

UNITED STATES PATENT AND TRADEMARK OFFICE
CERTIFICATE OF CORRECTION

PATENT NO. : 11,176,220 B2
APPLICATION NO. : 15/701878
DATED : November 16, 2021
INVENTOR(S) : Jaggers et al.

Page 1 of 1

It is certified that error appears in the above-identified patent and that said Letters Patent is hereby corrected as shown below:

On the Title Page

On page 2, Column 2, under Other Publications, Line 3, delete "www informit.com" and insert -- www.informit.com --, therefor.

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*